United States Patent [19]
Schwede et al.

[11] Patent Number: 6,150,486
[45] Date of Patent: *Nov. 21, 2000

[54] METHOD FOR PRODUCING GLYCIDYL (METH) ACRYLATE COPOLYMERS

[75] Inventors: Christian Schwede; Walter Schubert; Carmen Flosbach, all of Wuppertal; Friedhelm Bandermann, Velhert; Aurel Wolf, Essen, all of Germany

[73] Assignee: Herberts GmbH, Wuppertal, Germany

[*] Notice: This patent is subject to a terminal disclaimer.

[21] Appl. No.: 09/355,305

[22] PCT Filed: Nov. 28, 1998

[86] PCT No.: PCT/EP98/07646

§ 371 Date: Oct. 18, 1999

§ 102(e) Date: Oct. 18, 1999

[87] PCT Pub. No.: WO99/28361

PCT Pub. Date: Jun. 10, 1999

[30] Foreign Application Priority Data

Nov. 28, 1997 [DE] Germany .......................... 197 52 747

[51] Int. Cl.$^7$ ...................................................... C08F 2/00
[52] U.S. Cl. .......................... 526/213; 526/319; 526/320
[58] Field of Search ..................... 526/213, 319, 526/320

[56] References Cited

U.S. PATENT DOCUMENTS

| 3,364,048 | 1/1968 | May et al. |
| 3,495,999 | 2/1970 | Hagopian . |
| 4,414,370 | 11/1983 | Hamielec . |
| 4,529,787 | 7/1985 | Schmidt . |
| 4,546,160 | 10/1985 | Brand . |
| 5,384,358 | 1/1995 | Wamprecht . |

FOREIGN PATENT DOCUMENTS

| 0 206 072 | 12/1986 | European Pat. Off. . |
| 0 206 072 A2 | 12/1986 | European Pat. Off. . |
| 42 09 035 A1 | 9/1993 | Germany . |

*Primary Examiner*—Helen L. Pezzuto
*Attorney, Agent, or Firm*—Pillsbury Madison & Sutro LLP

[57] ABSTRACT

Process for the production of glycidyl (meth)acrylate copolymers with a number-average molar mass (Mn) of 1000 to 6000 g/mol by solvent-free, continuous copolymerisation of glycidyl (meth)acrylate with ethylenically unsaturated monomers, in a reaction vessel with feed and discharge means in the presence of a polyester oligomer, wherein polyester oligomer or a mixture of glycidyl (meth) acrylate copolymer and polyester oligomer is initially introduced in a weight ratio of from 95:5 to 50:50 and the glycidyl (meth)acrylates, further monomers, further polyester oligomer and, optionally, free-radical initiators are added, the addition together with discharge of the copolymers formed being effected in such a way that the residence time required for formation of the desired composition is achieved, and wherein, in the event of the initial introduction of the mixture of glycidyl (meth)acrylate copolymer and polyester oligomer, addition is effected in such a way that the ratio between copolymer and oligomer is maintained.

8 Claims, No Drawings

METHOD FOR PRODUCING GLYCIDYL (METH) ACRYLATE COPOLYMERS

FIELD OF THE INVENTION

This invention relates to a process for the continuous production of low molecular weight glycidyl (meth)acrylate copolymers with a narrow molecular weight distribution.

BACKGROUND OF THE INVENTION

A number of procedures are known for producing low molecular weight acrylic polymers. Achievement of the desired molecular weight and distribution is influenced by the type of process control applied (discontinuous, semi-continuous, continuous operation), by the reaction conditions (for example reaction temperature) and the materials system selected (solvent, initiator, chain-transfer agent). Thus, the solvent, initiator type and concentration and chain-transfer agent may purposefully be selected to achieve a desired molecular weight and distribution.

Discontinuous and semicontinuous methods in particular do not always proceed without complication, since undesirable proportions of homopolymer or copolymer having an undesirable composition or microstructure may be formed.

Semicontinuous production of (meth)acrylic polymers in the presence of polyester oligomers is known to the person skilled in the art. The polymer may be produced by free-radical polymerisation carried out according to conventional processes, wherein at least part and preferably at least half of the monomer mixture to be used for synthesis of the (meth)acrylic polymer is added to the initial polyester resin at a given reaction temperature. The polymerisation reaction may be initiated using known free-radical initiators. When polymerising, the monomers may also be added separately or with a time delay. The polyester resin is preferably initially introduced in the form of a solution in an organic solvent or in solvents conventional to the lacquer industry.

In general, processes of this type are carried out using an organic solvent. Furthermore, semi- and discontinuous modes of operation permit only limited obtainment of chemically uniform copolymers with the desired microstructure. Moreover, the narrow molecular weight distribution required for certain applications may be achieved only with difficulty.

EP-A-0 206 072 describes a semicontinuously operated process for the production of low molecular weight acrylic polymers. In general, a polymer material acting as solvent is initially introduced and heated to the reaction temperature, the vinyl monomer component and the free-radical initiator then being added in continuous manner. After addition of the components, the reaction continues until it is complete, the reaction product being isolated only thereafter. The vinyl monomer components may for example comprise conventional (meth)acrylates, styrene derivatives or glycidyl (meth)acrylates. The polymer material acting as solvent has a molecular weight of at least 200, preferably at least 1000 g/mol. It preferably contains functional groups which are substantially unreactive with the functionalities of the vinyl monomer component or of the polymer product. The polymer material may consist, for example, of polyester polyols. Although carrying out polymerisation with a combination of a high reaction temperature and a high feed rate does indeed result in a low molecular weight, non-gelled reaction product, a uniform product may be achieved only by taking elaborate measures to establish the reaction conditions. Furthermore, unreacted vinyl monomer components may be present in the reaction mixture, for example in an amount of up to 10 wt. %, relative to the reaction mixture.

According to U.S. Pat. Nos. 4,414,370, 4,529,787 and U.S. Pat. No. 4,546,160, low molecular weight vinyl polymers with narrow molecular weight distribution are produced by adding a vinyl monomer mixture continuously at a high reaction temperature and specified flow rates to a molten mixture of unreacted vinyl monomer and the vinyl polymer obtained therefrom. In addition to formation of the reaction product, this allows a certain amount of reaction mixture to be retained in the reaction zone. The reaction product is discharged from the reaction zone at the same rate as the monomer components are fed thereto. Unreacted monomers may be reused by being returned to the reaction system. The viscosity of the product may be reduced and the reaction parameters may optionally be controlled by the use of a solvent, for example higher aromatic alcohols, glycol ethers and glycol esters.

SUMMARY OF THE INVENTION

The object of the present invention is to produce low molecular weight glycidyl (meth)acrylate copolymers with narrow molecular weight distribution in a continuous manner without using any additional solvent. At the same time, monomer conversion should be as complete as possible.

It has been found that this object may be achieved by a process in which the low molecular weight glycidyl (meth)acrylate copolymer may be produced continuously in the presence of a low molecular weight polyester from a monomer mixture containing the glycidyl (meth)acrylate.

If several polyester oligomers are used, they may be present as a mixture during production of the glycidyl (meth)acrylate copolymers or individual ones or some of the polyesters may be used, the remaining polyesters being added at a later point.

The glycidyl (meth)acrylate copolymers are produced by continuous free-radical polymerisation. To this end, polyester oligomer alone or a mixture of glycidyl (meth)acrylate copolymer and polyester oligomer is initially introduced into a reaction vessel in a ratio of copolymer to oligomer of from 95:5 to 50:50 and heated to the reaction temperature, glycidyl (meth)acrylate, further vinyl monomers and oligoesters optionally together with free-radical initiators being added continuously. If the mixture of copolymer and polyester oligomer is initially introduced, addition is effected in such a way that the ratio between the glycidyl (meth)acrylate copolymer and the oligoester amounts constantly over time to from 95:5 to 50:50, preferably to from 70:30 to 55:45, particularly preferably to 60:40.

Establishing a fixed flow rate preferably allows a residence time of the monomers, the oligoester and optionally the free-radical initiators in the reaction vessel of at least 10 minutes, within which time the glycidyl (meth)acrylate copolymer is formed. At the same time, the selected flow rate ensures that a given constant amount of monomer mixture remains in the reactor zone. The glycidyl (meth) acrylate copolymer formed is withdrawn continuously from the reaction mixture at the same flow rate as that at which the monomer mixture and the oligoester are fed thereto.

The polymerisation temperature may vary, for example in the range of from 180° C. to 280° C., depending on the monomer composition used. Within this temperature range, the relationship between desired characteristics such as molecular weight, dispersion index, purity and conversion is at its most favourable. Above a temperature of 280° C., undesirable yellowing, depolymerisation and undesirable secondary products may possibly occur.

The process may be carried out at pressures of up 20 bar. In principle, it is also possible to operate without the use of pressure.

Moreover, additional pressure may also be applied for example by using gases as an auxiliary substance, whereby a reduction in the reaction temperature may be achieved.

The residence time and thus the reaction time is controlled by adjustment of the flow rate of the reactants and the oligoester or the reaction product through the reactor. A high flow rate reduces the reaction time between the reactants, and vice versa. In the case of elevated residence times in particular, the molecular weight of the glycidyl (meth) acrylate copolymer may be lowered according to the invention within the temperature range established according to the invention. The molecular weight of the copolymer according to the invention may also be lowered by increasing the reaction temperature within the temperature range according to the invention for a given residence time.

In order to be able to ensure as a high as possible a level of monomer conversion together with the desired low molar mass with narrow distribution, an average residence time with minimum values of from 2 to 10 minutes is advantageous, depending on the reactor type. Average residence times of from 20 to 120 minutes are preferably established, using a continuously operating agitated tank for example, 30 to 90 minutes being particularly preferred. A molecular weight Mn of 2000 g/mol may be achieved, for example, with a temperature of 230° C. and a residence time of 65 minutes.

The polymerisation reaction is carried out without the use of solvents. They are replaced by the polyester oligomer used according to the invention.

The polymerisation reaction is preferably initiated using small amounts of free-radical initiators. To achieve complete conversion of the monomer mixture into the desired glycidyl (meth)acrylate copolymer, without at the same time producing undesirable secondary reactions, and thus to achieve a quick, efficient and economic polymerisation process, it is advantageous to reduce the use of polymerisation initiators as far as possible. Where initiators are used, the type and amount thereof are so selected that they are completely consumed at the end of the reaction. The initiators may, for example, be added to the monomer mixture in an amount of from 0 to 4 wt. %, relative to the initial weight of monomer.

Examples of free-radical initiators are dialkyl peroxides, diacyl peroxides, hydroperoxides, per esters, peroxydicarbonates, perketals, ketone peroxides, azo compounds and CC-cleaving initiators.

The reaction is particularly preferably carried out without the use of initiators.

In order to control molecular weight, small amounts of conventional chain-transfer agents may additionally be used, for example mercaptans, thioglycol esters, chlorinated hydrocarbons, cumene.

The polymerisation conditions according to the invention, such as reaction temperature, residence time and composition of the reaction mixture allow the formation of glycidyl (meth)acrylate copolymers according to the invention with a number-average molar mass Mn (determined by gel permeation chromatography using polystyrene as the calibration material) of between 1000 and 6000 g/mol, in particular between 2000 and 3000 g/mol, with from 90 to 95% monomer conversion and a dispersion index of less than 2.

The glycidyl (meth)acrylate copolymers according to the invention preferably lie within a glass transition temperature range of between −5 and +50° C., preferably between 0 and +40° C. They preferably have a hydroxyl value of from 10 to 350 mg KOH/g and an acid value of from 0 to 2.5 mg KOH/g. The glycidyl (meth)acrylate copolymers according to the invention preferably do not comprise any acid groups.

In addition to glycidyl (meth)acrylate, further monomers may be used as the monomers for producing the glycidyl (meth)acrylate copolymers. For example, use may be made of hydroxyalkyl esters of (meth)acrylic acid, non-functionalised (meth)acrylates and further non-functionalised monomers.

The expression (meth)acrylic denotes acrylic and/or methacrylic.

The following compounds constitute examples of hydroxy functional monomers which may be used: hydroxyalkyl esters of α,β-unsaturated carboxylic acids such as (meth)acrylic acid, for example hydroxyethyl (meth) acrylate, butanediol monoacrylate, reaction products from reacting hydroxyethyl (meth)acrylate with caprolactone, adducts of glycidyl (meth)acrylate and saturated short-chain fatty acids, adducts of glycidyl esters of highly branched monocarboxylic acids, for example Cardura E (glycidyl ester of versatic acid), and unsaturated COOH-functional compounds such as, for example, (meth)acrylic acid, maleic acid, crotonic acid, adducts of Cardura E and unsaturated anhydrides such as, for example, maleic anhydride, and reaction products from reacting glycidyl (meth)acrylate with saturated branched or unbranched fatty acids, for example butyric acid, caproic acid, palmitic acid.

Examples of non-functionalised (meth)acrylates are long-chain branched or unbranched alkyl (meth)acrylates such as, for example, ethylhexyl (meth)acrylate, decyl (meth) acrylate, hexadecyl (meth)acrylate and tert.-butyl-cyclohexyl (meth)acrylate.

Examples of short- and medium-chain alkyl (meth) acrylates are methyl (meth)acrylate, butyl (meth)acrylate, pentyl (meth)acrylate, dodecyl (meth)acrylate, octadecenyl (meth)acrylate. Preferred monomers are methyl (meth) acrylate and butyl (meth)acrylate.

Examples of further non-functionalised monomers are monovinyl aromatic compounds, for example styrene, vinyltoluene, chlorostyrene, methylstyrene, vinylphenol and vinyl esters of α,α-dialkyl-substituted branched aliphatic monocarboxylic acids, together with alkyl esters of maleic acid, fumaric acid, tetrahydrophthalic acid, crotonic acid and vinyl acetic acid. Styrene and its derivates, such as vinyltoluene for example, are preferably used.

Further monomers such as polyunsaturated monomers may optionally also be used. Examples of polyunsaturated monomers are monomers having at least two polymerisable olefinically unsaturated double bonds, such as, for example, hexanediol di(meth)acrylate, ethylene glycol di(meth) acrylate and trimethylolpropane tri(meth)acrylate. Monomers of this type are advantageously contained in the monomer mixture in a proportion of less than 5 wt. % relative to the total weight of the monomers.

Use is preferably made of a monomer mixture of glycidyl (meth)acrylate, hydroxyalkyl esters of (meth)acrylic acid, non-functionalised (meth)acrylates and further non-functionalised monomers, a particularly preferred monomer mixture consisting of glycidyl (meth)acrylate, non-functionalised (meth)acrylates and further non-functionalised monomers.

Proportions may vary within the following ranges, for example:

3 to 80 wt. % glycidyl (meth)acrylate
0 to 30 wt. % hydroxyalkyl ester of (meth)acrylic acid
20 to 80 wt. % non-functionalised (meth)acrylates and
0 to 80 wt. % further non-functionalised monomers,
wherein the sum of the monomers is in each case 100%. For example, a monomer composition may be used which consists of from 30 to 35 wt. % styrene, 20 to 50 wt. % glycidyl (meth)acrylate and 20 to 45 wt. % butyl acrylate.

The polyester oligomer used according to the invention preferably has a number-average molar mass Mn of 200 to 2000, particularly preferably of 500 to 1000 g/mol, a hydroxyl value of 120 to 460 mg KOH/g, particularly preferably 150 to 280 mg KOH/g, together with an acid value of 0 to 5 mg KOH/g. The polyester oligomer preferably contains functional groups which are substantially unreactive with those of the monomers according to the invention or the copolymer. The polyester oligomer may be produced, for example, by polycondensation of polycarboxylic acids with polyhydric alcohols in accordance with conventional processes familiar to the person skilled in the art, for example in the presence of conventional esterification catalysts and at elevated reaction temperatures of, for example, 180 to 250° C., for example as a melt.

Suitable polycarboxylic acids or their anhydrides are, for example, phthalic anhydride, hexahydropthalic acid/anhydride, cyclohexanedicarboxylic acid, maleic acid/anhydride, succinic acid/anhydride, adipic acid, sebacic acid, trimeric fatty acids and mixtures of these and other acids. Suitable polyhydric alcohols are, for example, ethylene glycol, propylene glycol, butanediol, hexanediol, triethylene glycol, hydrogenated bisphenols, glycerol, trimethylolpropane pentaerythritol and mixtures of these and other polyhydric alcohols.

Monocarboxylic acids, monohydric alcohols and hydroxy-carboxylic acids may also be used. Examples of monocarboxylic acids are benzoic acid, hexahydrobenzoic acid, hydrogenated technical-grade fatty acids such as stearic acid, palmitic acid. Examples of monohydric alcohols are n-hexanol, cyclohexanol, dodecanol, octanol and natural and synthetic fatty alcohols such as lauryl alcohol, for example. Examples of hydroxycarboxylic acids are dimethylpropionic acid, lactic acid, malic acid, tartaric acid and ε-caprolactone.

Use is preferably made of a polyester oligomer which is free of aromatic hydrocarbons and based on polycarboxylic acids, for example hexahydrophthalic anhydride, together with dihydric alcohols, for example 1,6-hexanediol.

Reactors for continuous operation familiar to the person skilled in the art are suitable for carrying out the process. They comprise, for example, feed means for monomers and other reactants, for example auxiliary substances, together with outlet means for the end products. Examples of suitable reactors are continuously operated agitated tanks, tubular reactors or combinations of different reactors.

It is advantageous, according to the invention, to use a reactor which allows continuous operation through continuous feed of monomers and other feedstock and continuous discharge of the end product and which may, moreover, be operated not only when partly but also when completely full, i.e. flooded. In a reactor of this type, continuous thorough mixing of the contents may be carried out, for example by stirring with one or more stirrers and/or by continuous removal and introduction of some of the contents out of and back into the reactor.

The process according to the invention results in a low molecular weight glycidyl (meth)acrylate copolymer with a narrow molar mass distribution. By carrying out the process in the presence of the polyester oligomer and substantially in the absence of chain-transfer agents and free-radical initiators and without solvents, it is possible to achieve virtually complete conversion of the monomers. Minimal amounts of unreacted monomers may be returned to the reaction process during or after completion of the reaction. Reaction conditions such as a high reaction temperature and residence time likewise contribute to the high level of monomer conversion and result in the low molecular weight, non-gelled glycidyl (meth)acrylate copolymers according to the invention.

Moreover, it is possible, in particular through use of the continuously operating, flooded and continuously thoroughly mixed reactor, to obtain a low molecular weight glycidyl (meth)acrylate copolymer with a constantly uniform product composition.

The glycidyl (meth)acrylate copolymers produced according to the invention may be used, for example, as binders for lacquer compositions, either alone or mixed with further binders and optionally crosslinking agents.

The presence of the glycidyl (meth)acrylate copolymer produced according to the invention in the polyester oligomer used according to the invention ensures its availability in a form ready for use in lacquer compositions, such that the dissolving and dispersing stages conventionally required in the production of lacquer compositions may be dispensed with. Furthermore, the process according to the invention promotes compatibility between the glycidyl (meth)acrylate copolymer and the polyester oligomer.

Generally speaking, the glycidyl (meth)acrylate copolymers produced according to the invention are also suitable for use in powder coating compositions.

DETAILED DESCRIPTION OF THE PREFERRED EMBODIMENTS

The following Examples describe the continuous method of operation according to the invention with reference to specific monomers, reaction conditions and reaction products.

EXAMPLE 1

Synthesis of an Oligoester 1603 g of hexanediol, 1394 g of hexahydrophtalic anhydride and 3 g of hypophosphorous acid are introduced into a 4 liter three-necked flask provided with water separator, reflux condenser and stirrer and melted therein. The mixture is heated to a maximum of 240° C. with refluxing and water separation, until an acid value of ≦2 mg KOH/g solid resin is reached. The product obtained has a viscosity of 5000 mPas at 25° C. and a colour index of at most 50 Hazen.
Production of a Monomer Mixture The monomer mixture used below is composed of 30 wt% styrene, 35 wt. % butyl acrylate and 35 wt. % glycidyl methacrylate.
Continuous Polymerisation 440 g of oligoester are introduced into a stirred 1 liter stainless steel reactor equipped with an oil-heatable double jacket, anchor agitator, two metering pumps for controlling the feed stream and the exit stream and filling level control means and are heated to the reaction temperature. Once 230° C. is reached, a feed stream of the monomer mixture and the oligoester and an exit stream of reaction composition are established in such a way as to result in a residence time of 62 minutes. A sample taken after 310 minutes reveals monomer-specific conversion for styrene of 91%, for glycidyl methacrylate of 89% and for butyl acrylate of 84%. A number-average molar mass for the acrylate of 2600 g/mol, a weight-average molar mass of 4100 g/mol and a dispersion index D=Mw/Mn of 1.6 were determined.

EXAMPLE 2

Production of a Lacquer 50 parts of the resin obtained from the continuous polymerisation process in Example 1 are mixed with 50 parts of a commercially available acidic polyester with an acid value of 210 g/mol and diluted with a 1:1 mixture of xylene/butyl acetate to a spraying viscosity of 25 seconds AK4.

A cataphoretically electrocoated sheet, which had been coated with a commercially available aqueous base lacquer, was then coated using a spray gun and the above-mentioned lacquer to a dry film thickness of 40 μm. The sheet is stoved for 25 minutes at 140° C. The clear lacquer film obtained is distinguished by a high-gloss, very well levelled surface.

What is claimed is:

1. A process for the production of glycidyl (meth)acrylate copolymers having a number-average molar mass (Mn) of 1000 to 6000 g/mol wherein said process comprises:

copolymerizing one or more glycidyl (meth)acrylates with one or more ethylenically unsaturated monomers, in the presence of a polyester oligomer, wherein said copolymerization is carried out in the absence of solvents and continuously in a reaction vessel having feed and discharge means, wherein the polyester oligomer or a mixture of glycidyl (meth)acrylate copolymer and the polyester oligomer having a weight ration range of copolymer to oligomer of from 95:5 to 50:50 is introduced into the reaction vessel through the feed means, and wherein said copolymerization comprises:

adding to the reaction vessel the glycidyl (meth)acrylates, additional monomers selected from the group consisting of hydroxyalkyl esters of (meth)acrylic acid, non-functionalized (meth)acrylic acid and non-functionalized (meth)acrylates, additional polyester oligomers and, optionally, free-radical initiators;

discharging the glycidyl (meth)acrylate copolymers formed through the discharge means at a flow rate that is equal to a flow rate of said adding of the glycidyl (meth)acrylates, the additional monomers, the additional polyester oligomers and, optionally, the free-radical initiators;

wherein said adding of the glycidyl (meth)acrylates, the additional monomers, the additional polyester oligomers and, optionally, the free radical initiators and said discharging of the glycidyl (meth)acrylate copolymers formed are carried out such that the residence time required for formation of the glycidyl (meth)acrylate copolymers is achieved, and wherein, in the event that the mixture of glycidyl (meth) acrylate copolymer and polyester oligomer is initially introduced into the reaction vessel, intorduction thereof, is carried out such that the weight ratio range between copolymer and oligomer is maintained.

2. The process according to claim 1, wherein the average residence time is 10 to 120 minutes.

3. The process according to claim 1, which is carried out at a temperature of from 180 to 280° C.

4. The process according to one of claims 1 to 3, characterised in that the weight ratio between the glycidyl (meth)acrylate copolymer and the polyester oligomer is from 70:30 to 55:45.

5. The process according to claim 1, wherein a polyester oligomer with a number-average molar mass (Mn) of from 200 to 2000 g/mol is used.

6. The process according to claim 1, wherein it is carried out with a monomer mixture of 3 to 80 wt. % of glycidyl (meth)acrylate, 0 to 30 wt. % of one or more hydroxyalkyl esters of (meth)acrylic acid 20 to 80 wt. % of one or more non-functionalised (meth) acrylates and 0 to 80 wt. % of one or more ethylenically unsaturated monomers, wherein the sum of the monomers is in each case 100 wt. %.

7. The process according to claim 1, wherein a continuous feed is provided through the feed means for the one or more glycidyl (meth)acrylates, the one or more ethylenically unsaturated monomer, the polyester oligomer or the mixture of the glycidyl (meth)acrylate copolymer and polyester oligomer, the additional monomers, the additional polyester oligomers and the optional free radical initiators, and a continuous discharge of the glycidyl (meth)acrylate copolymers is provided through the discharge means, wherein contents of the reaction vessel are continuously and thoroughly mixed by one or more stirrers or by continuous recirculation of part of the contents discharged from said reaction vessel through said discharge means, back into said reaction vessel through said feed means.

8. A process for using the copolymer obtained by the process according to claim 1, comprising adding the copolymer to a process mixture for producing coating compositions.

* * * * *